(12) United States Patent
Chen

(10) Patent No.: US 7,165,261 B2
(45) Date of Patent: Jan. 16, 2007

(54) LOCKING MEMBER FOR AN OPTICAL DISK DRIVE

(75) Inventor: Jung-Fu Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 531 days.

(21) Appl. No.: 10/605,914

(22) Filed: Nov. 6, 2003

(65) Prior Publication Data

US 2004/0221300 A1   Nov. 4, 2004

(30) Foreign Application Priority Data

Apr. 30, 2003   (TW) ............................... 92110233 A

(51) Int. Cl.
G11B 33/02   (2006.01)
(52) U.S. Cl. ....................................... 720/610
(58) Field of Classification Search ................ 720/610, 720/609, 601
See application file for complete search history.

(56) References Cited

U.S. PATENT DOCUMENTS

| | | | |
|---|---|---|---|
| 4,117,997 A * | 10/1978 | Gitzendanner | .............. 248/646 |
| 5,035,396 A * | 7/1991 | Krum et al. | ................. 248/635 |
| 5,668,791 A * | 9/1997 | Yamada et al. | ............. 720/693 |
| 5,936,927 A * | 8/1999 | Soga et al. | .................. 720/611 |
| 6,116,566 A * | 9/2000 | Brown et al. | ................ 248/694 |
| 6,661,603 B1 * | 12/2003 | Watkins et al. | .......... 360/97.01 |
| 6,727,612 B1 * | 4/2004 | Hull et al. | ................. 310/68 D |
| 6,826,019 B1 * | 11/2004 | Misso et al. | ............. 360/265.1 |

* cited by examiner

Primary Examiner—Angel Castro
(74) Attorney, Agent, or Firm—Winston Hsu

(57) ABSTRACT

A locking member for use in an optical disk drive includes a rivet and a hollow element. The hole defined on the chassis of the optical disk drive is sized to receive the rivet, and the rivet extends through the hollow element. The rivet can be fixed on the chassis by riveting, and the locking member can absorb a large impact or shock. Alternatively, screw threads can be integrally formed on the hollow element and the rivet. The rivet can be threaded through and engage with the hollow element to absorb the impact or shock without breakage or failure of the locking member.

13 Claims, 5 Drawing Sheets

LOCKING MEMBER FOR AN OPTICAL DISK DRIVE

BACKGROUND OF INVENTION

1. Field of the Invention

The present invention relates to an optical disk drive, and in particular, to a locking member that is effective in resisting impact or shock that may be experienced by the optical disk drive.

2. Description of the Prior Art

Optical disk drives are becoming more popular in the market, having been considered standard equipment on personal computer for several years. Recently, slim-type optical disk drives, which can be used to conveniently load and unload optical disks, are being shipped with portable computers such as notebooks. In an attempt to reduce the cost and adapt to the limited space constraint within notebooks, the conventional motor for disk loading and unloading operations has been eliminated. FIGS. 1–4 illustrate a conventional disk drive and its loading and unloading device. The conventional disk drive has a chassis 1, a disk tray 2, a playback unit 3, a locking mechanism 4, and a locking member 5. The disk tray 2 and the playback unit 3 are positioned inside the chassis 1, and the playback unit 3 is positioned above the disk tray 2. When the tray 2 is ejected along the direction of arrow A as shown in FIGS. 1 and 2, the user can place an optical disk on the playback unit 3 and then push the disk tray 2 back into the chassis 1 along the reverse of the direction of arrow A.

Referring to FIG. 2, the conventional locking mechanism 4 is positioned on the disk tray 2 and inside the chassis 1 and functions to prevent the disk tray 2 from being inadvertently ejected when the optical disk drive is in use. The locking member 5 is secured to the chassis 1 by riveting and is positioned near a front panel 10 of the disk tray 2 as shown in FIG. 1. When the optical disk drive is being transported from one location to another, shock and other impact are inevitable. In this regard, if the shock or impact is applied along the direction of arrow A in FIGS. 1 and 2, the energy will be absorbed by the locking member 5. As shown in FIG. 3, if the optical disk drive is subjected to large shock or impact along the direction of arrow A, the locking mechanism 4 will supply a large bending moment and shear force to the locking member 5. Referring to FIG. 4, the connection between the locking member 5 and the chassis 1 is indicated by the arrow C. If the energy of the shock is too large, the locking member 5 will fracture or fail. Once the locking member 5 is bent or broken, the disk tray 2 cannot be locked inside the chassis 1, thereby rendering the optical disk drive unusable.

Thus, there is a need to develop an optical disk drive locking member that is small in size and capable of withstanding high impact without breakage.

SUMMARY OF INVENTION

It is an object of the present invention to provide a locking member that can effectively withstand a large impact force for use in the optical disk drive.

It is another object of the present invention to provide a locking member that is suitable for use in a slim-type optical disk drive.

In order to accomplish the objects of the present invention, the present invention provides a locking member for use in an optical disk drive. The locking member includes a rivet and a hollow element. A hole defined on the chassis of the optical disk drive is sized to receive the rivet, and the rivet extends through the hollow element. The rivet can be fixed on the chassis by riveting, and the locking member can absorb the large impact or shock. Alternatively, a screw thread can be integrally formed with the hollow element and the rivet. The rivet can be threaded through to engage with the hollow element to absorb the impact or shock without breakage or failure of the locking member.

BRIEF DESCRIPTION OF DRAWINGS

The present invention can be fully understood from the following detailed description and preferred embodiment with reference to the accompanying drawings in which.

DETAILED DESCRIPTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the embodiments of the present invention are described below in connection with slim-type DVD-ROM drives, the present invention can be applied to all optical disk drives, including but not limited to CD-ROM drives, CD-RW drives, DVD-RAM drives, DVD-RW drives, DVD+RW drives, COMBO drives, car audio players, external drives, as well as all other optical media recorders and players.

Figure 1:
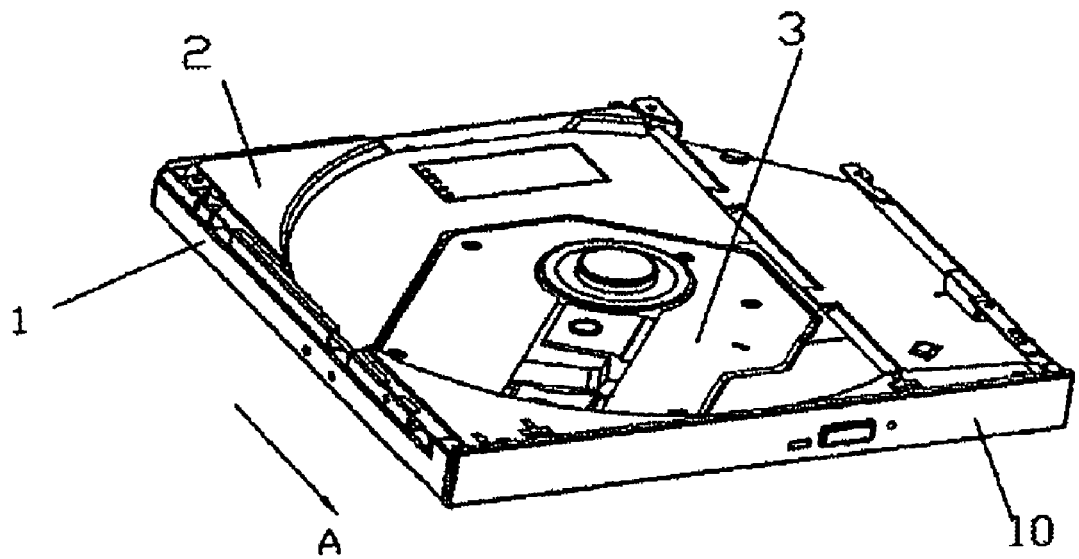
FIG. 1 is a perspective view of a conventional optical disk drive with a top cover removed.
Figure 2:
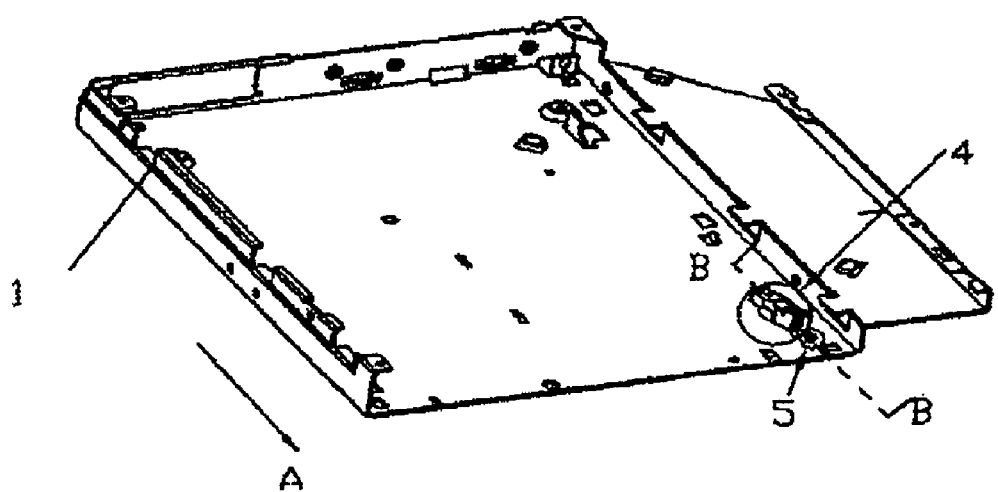
FIG. 2 is a perspective view of a chassis and a locking mechanism of the conventional optical disk drive.
Figure 3:
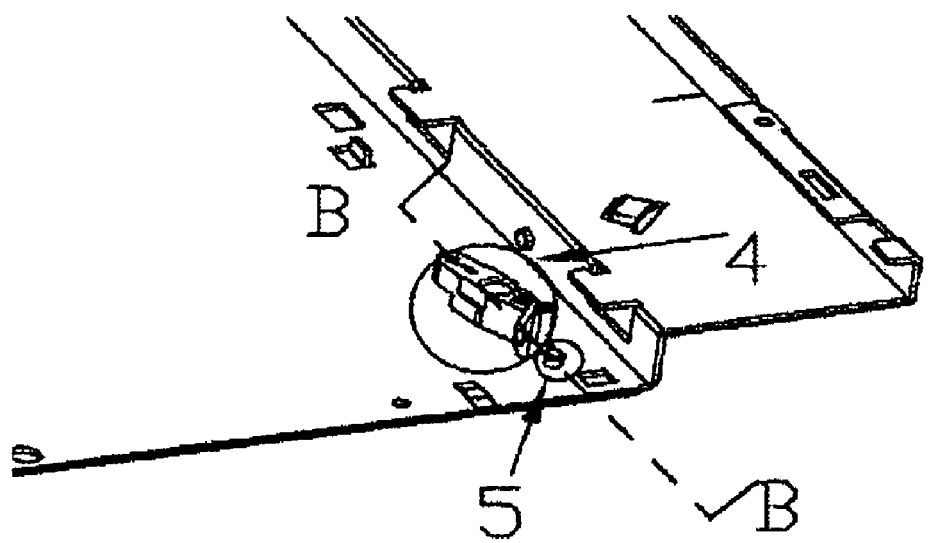
FIG. 3 is a partially enlarged perspective view of the conventional optical disk drive of FIG. 2.
Figure 4:
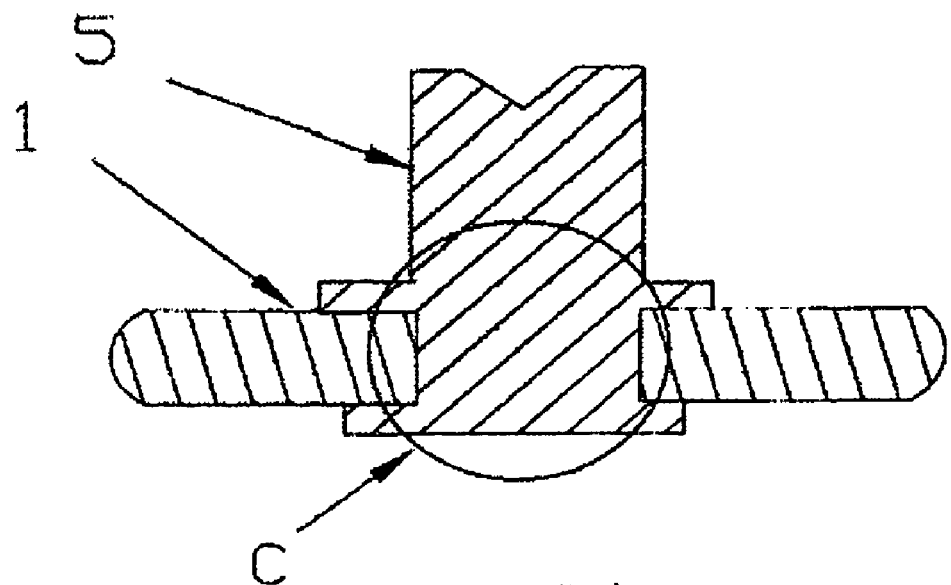
FIG. 4 is a cross-sectional view of the locking member of the conventional optical disk drive taken along the line B—B.
Figure 5:
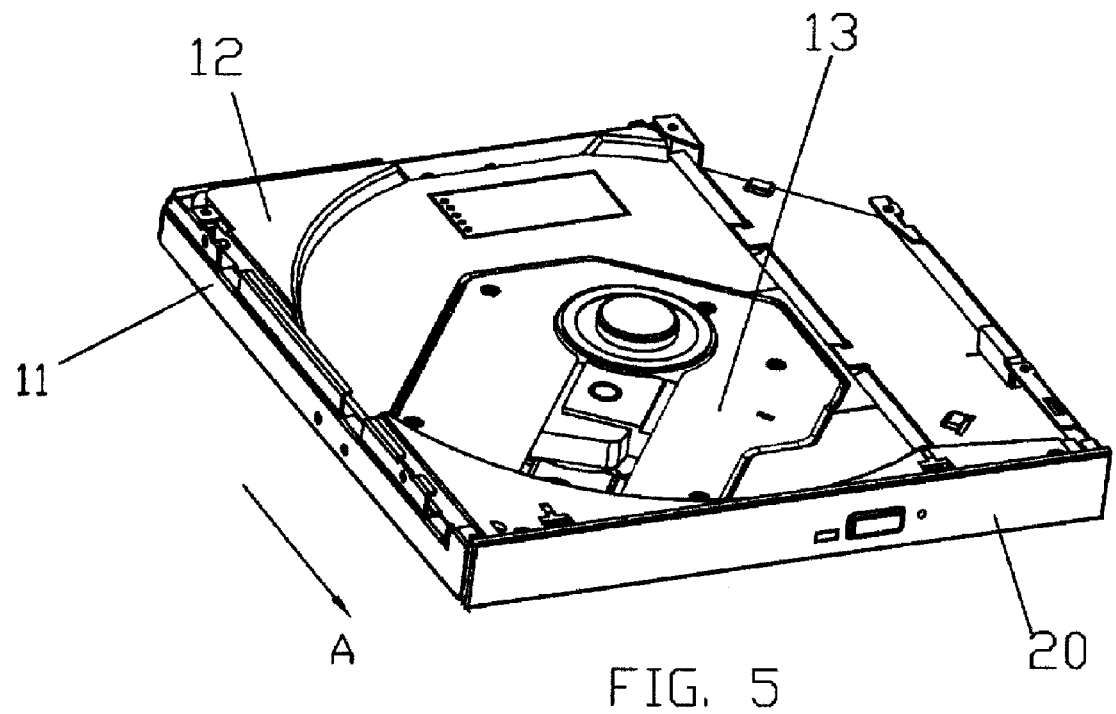
FIG. 5 is a top plan perspective view of the optical disk drive in accordance with the present invention with top cover removed.
Figure 6:
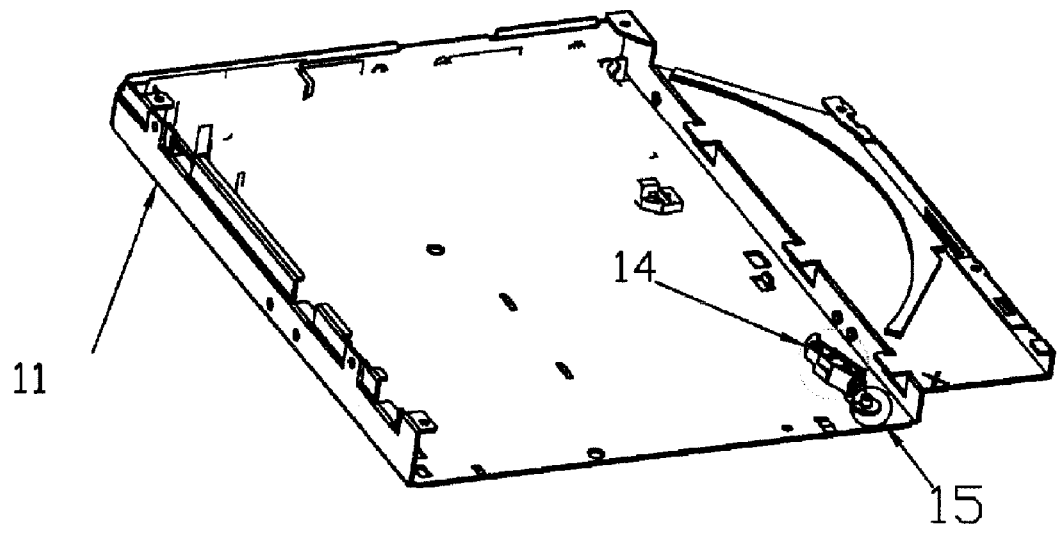
FIG. 6 is a perspective view of a locking member in accordance with the present invention with the top cover and the disk tray removed.

Referring to FIGS. 5 and 6, the optical disk drive of the present invention includes a chassis 11, a disk tray 12, and a playback unit 13 that can be the same as the a chassis 1, a disk tray 2 and a playback unit 3 of the conventional optical disk drive. The disk tray 12 and the playback unit 13 are positioned inside the chassis 11, and the playback unit 13 is positioned above the disk tray 12. When the disk tray 12 is ejected along the direction of arrow A as shown in FIG. 5, the user can place an optical disk on the playback unit 13 and then push the disk tray 12 back into the chassis 11. Referring to FIG. 6, the locking mechanism 14 and the locking member 15 are positioned on the disk tray 12 and inside the chassis 11 and function to prevent the disk tray 12 from being inadvertently ejected when the optical disk drive is in use. The locking member 15 is effective in absorbing the energy of shock or impact.

Figure 7:
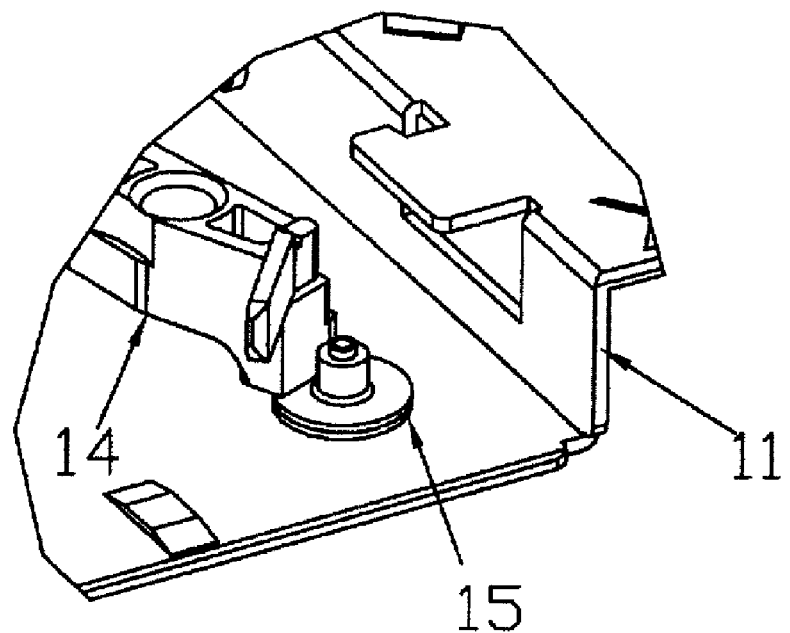
FIG. 7 is a partially enlarged perspective view of the present invention of FIG. 5.
Figure 8:
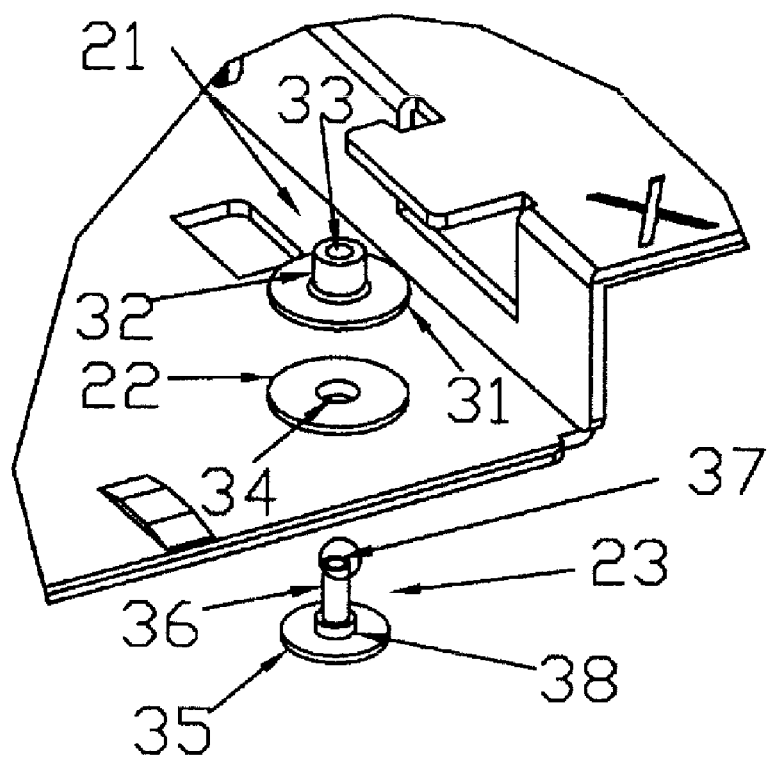
FIG. 8 is an exploded view of the locking member in accordance with the present invention.

FIGS. 7 and 8 illustrate the locking member in accordance with the present invention. Referring to FIGS. 7 and 8, the locking member 15 includes a hollow element 21, a protuberance 22, and a rivet 23. The hollow element 21 includes a base 31 and a rod 32. A hollow portion 33 extends downwardly from a top surface of the hollow element 21. The protuberance 22 is formed with the chassis 11 by a suitable manufacturing process (i.e. cold working), and a hole 34 is integrally formed with the protuberance 22. The rivet 23 includes a base 35 and a tubular projection 36. A recess 37 is integrally formed with the top surface of the tubular projection 36, and an enlarged portion 38 is integrally formed with the bottom of the tubular projection 36.

Further referring to FIGS. 7 and 8, during manufacture, the hollow element 21 is placed on the protuberance 22, and the base 31 is aligned with the protuberance 22 because the size of the base 31 is substantially the same as that of the protuberance 22. Then, the tubular projection 36 of the rivet 23 is inserted through the hole 34 of the protuberance 22. Further, the hollow portion 33 of the hollow element 21 is sized to receive the tubular projection 36 of the rivet 23. The enlarged portion 38 of the rivet 23 is adapted to be fitted into the hole 34 of the protuberance 22. Finally, the recess 37 of the rivet 23 is subjected to an external force (e.g. by riveting) so that the locking member 15 is fixed on the chassis 11 of the optical disk drive. Alternatively, a screw thread can be integrally formed on the inner surface of the hollow element 21. Likewise, a corresponding screw thread can also be integrally formed on the outer surface of the tubular projection 36. Then, after the hollow element 21 is placed on the protuberance 22, the base 31 can be aligned with protuberance 22. Thus, the tubular projection 36 of the rivet 23 can thread through and engage with the hollow portion 33 of the hollow element 21 because of the screw threads formed on both the hollow element 22 and the rivet 23.

Referring to FIGS. 7 and 8, the present invention provides an alternative of the locking member 15. A screw thread is integrally formed on the outer surface of the tubular projection 36, and there is no screw thread formed on the hollow portion 33 of the hollow element 21. Before the locking member 15 is fixed onto the chassis 11, the tubular projection 36 of the rivet 23 must be pushed through the hollow portion 33 of the hollow element 21 by an external torque or force. According to the present invention, the locking member 15 can withstand larger shock and impact compared to the prior art no matter whether the screw thread is integrally formed with the hollow element 21,with the rivet 23, or with both of them.

Figure 9:
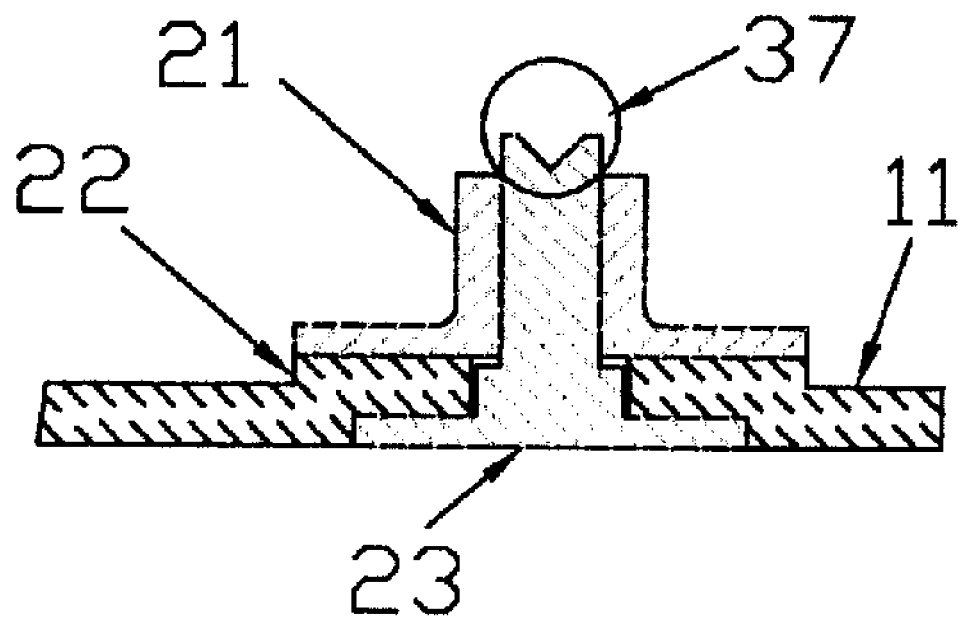
FIG. 9 is a cross-sectional view of the locking member in accordance with one embodiment of the present invention.
Figure 10:
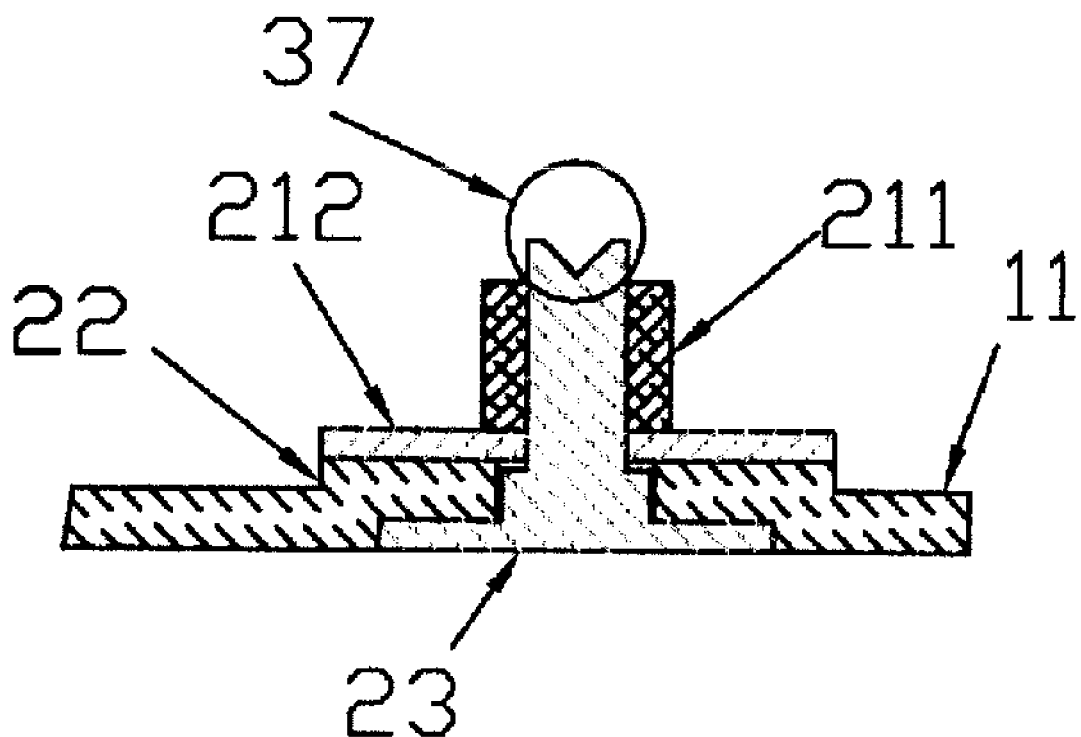
FIG. 10 is a cross-sectional view of the locking member in accordance with another embodiment of the present invention.

FIGS. 9 and 10 illustrate the embodiments of the locking member 15 in accordance with the present invention. Further referring to FIG. 9, as described above, the locking member 15 includes the hollow element 21, the protuberance 22, and the rivet 23. The tubular projection 36 of the rivet 23 can be inserted through the hole 34 of the protuberance 22, and slidably thread through the hollow portion 33 of the hollow element 21. Thus, the recess 37 will be subjected to riveting (i.e. cold working), preventing the rivet 23 from sliding from the chassis 11, such that the rivet 23 is firmly fixed to the chassis 11. Referring to FIG. 9, the hollow element 21 and the rivet 23 can be made of, but are not limited to metal, plastic, brass, etc. Furthermore, the shape of the base 35 and the tubular projection 36 of the rivet 23 can be, but are not limited to a circle, a square, a triangle, or a polygon, etc. Alternatively, the hollow element 21 and the rivet 23 are not configured with a screw thread, and thus, the locking member 15 can be fixed on the chassis 11 only by riveting.

FIG. 10 illustrates another embodiment of the locking member 15 in accordance with the present invention. The locking member 15 includes a bushing 211, a washer 212, the protuberance 22, and the rivet 23. A screw thread is integrally formed on the inner surface of the bushing 211. The rivet 23 extends through the washer 212 and the hole 34 of the protuberance 22, and slidably engages with the bushing 211. The bushing 211 is sized to receive the tubular projection 36, and the recess 37 of the rivet 23 is subjected to a suitable force (e.g. by riveting) so that the locking member 15 will be fixed on the chassis 11. The bushing 211, the washer 212, and the rivet 23 can be made of, but are not limited to metal, plastic, brass, etc. Furthermore, the shape of the base 35 and the tubular projection 36 of the rivet 23 can be, but are not limited to a circle, a square, a triangle, or a polygon, etc. Alternatively, the bushing 211, the washer 212, and the rivet 23 are not configured with a screw thread, and thus, the locking member 15 can be fixed on the chassis 11 only by riveting.

When compared with the conventional locking mechanism, the locking member 15 of the present invention can withstand a larger shock or impact to the optical disk drive. If the locking member 15 and the prior art locking mechanism are under the same conditions, the locking member 15 has a larger connection cross-sectional area resulting in less shear stress. In addition, the larger cross-sectional area of the locking member 15 of the present invention can withstand a larger moment and related bending stress without breakage and failure.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A locking member used in an optical disk drive having a chassis and function with a locking mechanism, comprising:
   a hollow element including a hollow portion;
   a protuberance, being integrally formed with the chassis and including a hole; and
   a rivet, including a base and a projection, wherein the projection extends through the hole of the protuberance and the hollow portion of the hollow element, and the base is contact to the protuberance.

2. The locking member as claimed in claim 1 wherein a screw thread is integrally formed on the hollow portion of the hollow element, and a screw thread is integrally Formed an a tubular projection of the rivet.

3. The locking member as claimed in claim 2, wherein the tubular projection of the river threads through the hollow portion of the hollow clement.

4. The locking member as claimed in claim 1, wherein the hollow element and the rivet are of metallic material.

5. The locking member as claimed in claim 1, wherein the hollow element and the river are of plastic.

6. A locking member used in an optical disk drive having a chassis and function with a locking mechanism, comprising:
   a bushing including a hollow portion;

a protuberance, being integrally formed with the chassis and including a hole;

a washer, having a hole and aligned with the protuberance; and a rivet, including a base and a projection, wherein the projection extends through the hole of the protuberance, the hole of the washer and the hollow portion of the bushing, and the base is contact to the protuberance.

7. The locking member as claimed in claim 6, wherein a screw thread is integrally formed on the hollow portion of the bushing, and a screw thread is integrally formed on a tubular projection of the rivet.

8. The locking member as claimed in claim 7, wherein the tubular projection of the rivet threads through the hollow portion of the bushing.

9. The locking member as claimed in claim 6, wherein the bushing, the washer and the rivet are of metallic material.

10. The locking member as claimed in claim 6, wherein the bushing, the washer and the rivet are of plastic.

11. An optical disk drive, comprising:

a chassis;

a disk tray, moveably disposed inside the chassis;

a locking mechanism, positioned on the disk tray; and a locking member, positioned on the chassis and function to lock the disk tray inside the chassis with the locking mechanism, the locking member having:

a protuberance, being integrally formed with the chassis and including a hole; and a rivet extending through the hole of the protuberance and fixed on the protuberance by riveting.

12. The optical disk drive as claimed in claim 11, wherein the locking member further has a hollow element including a hollow portion, and the rivet extends through the hole of the protuberance and the hollow portion of the hollow element.

13. The optical disk drive as darned in claim 11, wherein the locking member further has a bushing and a washer, and the rivet extends through the hole of the protuberance, a hole of the washer and a hollow portion of the bushing.

* * * * *